(12) United States Patent
Afrasiabi

(10) Patent No.: US 11,768,071 B2
(45) Date of Patent: Sep. 26, 2023

(54) APPARATUSES AND METHODS FOR INSPECTING A SURFACE

(71) Applicant: The Boeing Company, Chicago, IL (US)

(72) Inventor: Amir Afrasiabi, University Place, WA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 17/667,159

(22) Filed: Feb. 8, 2022

(65) Prior Publication Data

US 2023/0251082 A1 Aug. 10, 2023

(51) Int. Cl.
*G01S 17/86* (2020.01)
*G01B 11/30* (2006.01)
*G01S 17/894* (2020.01)
*G06T 7/00* (2017.01)
*H04N 23/56* (2023.01)

(52) U.S. Cl.
CPC ............ *G01B 11/303* (2013.01); *G01S 17/86* (2020.01); *G01S 17/894* (2020.01); *G06T 7/001* (2013.01); *H04N 23/56* (2023.01); *G06T 2207/30108* (2013.01)

(58) Field of Classification Search
CPC ..... G01B 11/303; G01S 17/86; G01S 17/894; H04N 23/56; G06T 7/001

USPC .......................................................... 348/92
See application file for complete search history.

(56) References Cited

U.S. PATENT DOCUMENTS

| | | |
|---|---|---|
| 2014/0375770 A1 | 12/2014 | Habel et al. |
| 2018/0169685 A1 | 6/2018 | Taylor et al. |
| 2021/0073970 A1 | 3/2021 | Afrasiabi et al. |
| 2021/0220997 A1 | 7/2021 | Unno et al. |

FOREIGN PATENT DOCUMENTS

CN 111673709 9/2020

OTHER PUBLICATIONS

Extended European Search Report for EP Patent Application No. 23155180.5 dated Jul. 3, 2023.

*Primary Examiner* — Nguyen T Truong
(74) *Attorney, Agent, or Firm* — Kanzler Bean & Adamson

(57) ABSTRACT

An apparatus for inspecting a surface comprises a light source and a camera. When a light beam is generated by the light source, a centerline of the light beam is coincident with a line of sight of the camera when viewed in a direction, perpendicular to a first plane that contains one of the centerline of the light beam or the line of sight of the camera. The centerline of the light beam is parallel to the line of sight of the camera when viewed in a direction, perpendicular to a second plane that is perpendicular to the first plane and that contains the centerline of the light beam and the line of sight of the camera.

20 Claims, 14 Drawing Sheets

APPARATUSES AND METHODS FOR INSPECTING A SURFACE

TECHNICAL FIELD

Described herein are apparatuses and methods for inspecting a surface.

BACKGROUND

During manufacture and assembly of a structure, such as an aircraft or a component thereof, it is desirable, in some situations, to determine surface-finish properties. Additionally, it is desirable to identify and remove foreign-object debris (FOD), if present on one or more surfaces of the structure. Manually inspecting the structure to determine surface-finish properties and/or to identify and remove FOD is expensive and time consuming. Additionally, space constraints, in many instances imposed by the geometry of the structure, make manual inspection difficult. Moreover, currently available automated solutions for surface inspection are costly and are generally unsuitable for confined-space applications.

SUMMARY

Accordingly, apparatuses and methods, intended to address at least the above-identified concerns, would find utility.

The following is a non-exhaustive list of examples of the subject matter, disclosed herein.

Disclosed herein is an apparatus for inspecting a surface. The apparatus comprises a light source, configured to generate a light beam, having a centerline. The apparatus also comprises a camera, having a line of sight. The apparatus further comprises a microprocessor, communicatively coupled with the camera. When the light beam is generated by the light source, the centerline of the light beam is coincident with the line of sight of the camera when viewed in a direction, perpendicular to a first plane that contains one of the centerline of the light beam or the line of sight of the camera. Additionally, when the light beam is generated by the light source, the centerline of the light beam is parallel to the line of sight of the camera when viewed in a direction, perpendicular to a second plane that is perpendicular to the first plane and that contains the centerline of the light beam and the line of sight of the camera.

The apparatus enables identification of the surface of the part and/or inspection of the surface of the part for foreign objects. The light source helps to produce shadows and light reflections from textures in the surface and from foreign objects on the surface. The camera, having the line of sight that is coincident with the centerline of the light beam when viewed in a direction, perpendicular to the first plane that contains one of the centerline of the light beam or the line of sight of the camera, and is parallel to the centerline of the light beam when viewed in the direction, perpendicular to the second plane that is perpendicular to the first plane and that contains the centerline of the light beam and the line of sight of the camera, enables locating both the light source and the camera close to the surface. The first plane is into the page in FIG. 4A and the second plane is into the page in FIG. 3A. Locating the light source close to the surface facilitates casting of enlarged shadows from the textures and/or foreign objects, compared to the size of the textures and/or foreign objects, and enhances reflections off the textures and/or foreign objects. Locating the camera close to surface promotes capturing, by the camera, images of shadows, cast from textures in the surface and/or foreign objects on the surface, and light reflections from the textures in the surface and/or foreign objects on the surface. The microprocessor facilitates processing of images captured by the camera for identifying and/or classifying the type of the surface and foreign objects on the surface.

Also disclosed herein is a method of using the apparatus to identify the surface. The method comprises steps of (1) capturing an image, which comprises pixels, of at least a portion of the surface using the camera, while illuminating the surface with the light beam, and (2) comparing the pixel pattern of the image to archived pixel patterns, each corresponding to one of a plurality of different types of surfaces, to determine whether or not the pixel pattern of the image matches one of the archived pixel patterns. An acute angle between the centerline of the light beam and the surface, measured in a plane, perpendicular to the surface and containing the centerline, is from 0 to 30 degrees. A grayscale value of at least one of the pixels is different than a grayscale value of at least another one of the pixels so that the pixels of the image form a pixel pattern.

The first method enables identification of the type of the surface of the part. Illuminating the surface with the light beam helps cast shadows from the surface features (e.g., textures) of the surface. Acute angle between the centerline of the light beam and the surface, being from 0 to 30 degrees, helps ensure shadows are cast from even small surface features. The grayscale value of at least one of the pixels, being different than the grayscale value of at least another one of the pixels, provides an indication that a surface feature, casting a shadow, is present in the image. Comparing the resulting pixel pattern of the image to archived pixel patterns, to determine whether or not the pixel pattern of the image matches one of the archived pixel patterns, enables identification of the type of the surface as the type of surface corresponding with the matching archived pixel pattern.

Further disclosed herein is a method of using the apparatus to inspect the surface for foreign objects. The method comprises steps of (1) capturing an image, which comprises pixels, using the camera, while illuminating the surface with the light beam, and (2) designating an object, projecting from the surface and having an area of contact with the surface, as one of the foreign objects when the image contains at least one of a first subset of the pixels, corresponding to a first continuous region on the surface, or a second subset of the pixels, corresponding to a second continuous region on a surface of the object. An acute angle between the centerline of the light beam and the surface, measured in a plane, perpendicular to the surface and containing the centerline, is from 0 to 30 degrees. The first continuous region on the surface is contiguous with the object. The first continuous region on the surface receives less energy from the light beam than does a circumferentially closed portion of the surface, circumscribing and fully bounding the first continuous region on the surface and the area of contact of the object with the surface. The second continuous region on the surface of the object reflects more energy from the light beam than a circumferentially closed portion of the surface of the object, circumscribing and fully bounding the second continuous region on the surface of the object.

The second method enables inspection of the surface of the part for foreign objects, using the light beam of the light source and images captured by the camera, to identify and designate foreign objects on the surface. The acute angle between the centerline of the light beam and the surface, being from 0 to 30 degrees, helps ensure shadows are cast from foreign objects on the surface and/or light is reflected off foreign objects on the surface. The first subset of pixels, when contained in the image, provides a digital representation of a shadow cast from foreign object on the surface. The second subset of pixels, when contained in the image, provides a digital representation of light reflected off the foreign object. Accordingly, when the image contains at least one of the first subset of pixels or the second subset of pixels, the presence of an object on the surface is determined and designated as a foreign object.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
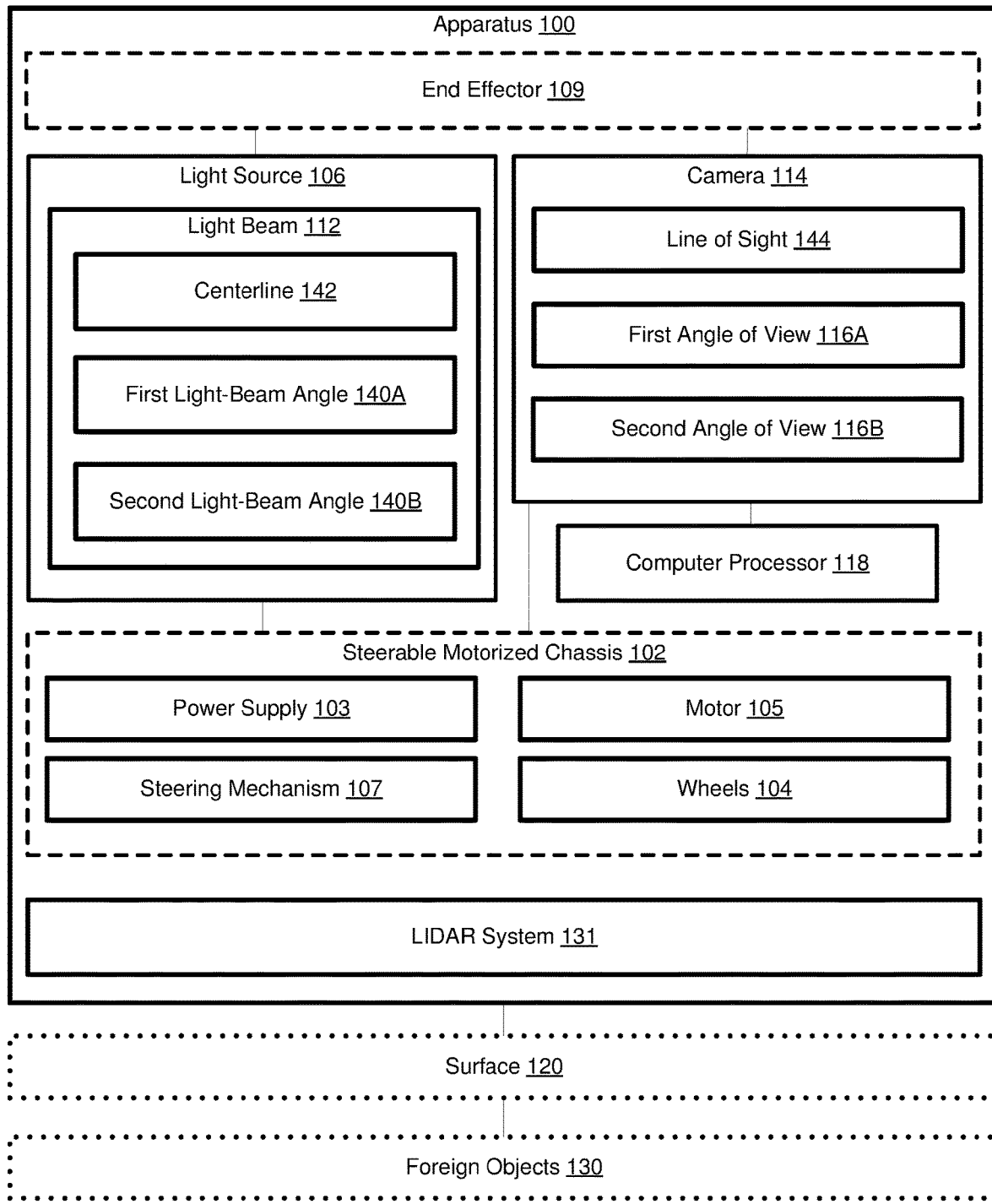
FIG. 1 is a block diagram of an apparatus for inspecting a surface, according to one or more examples of the subject matter, disclosed herein.
Figure 2:
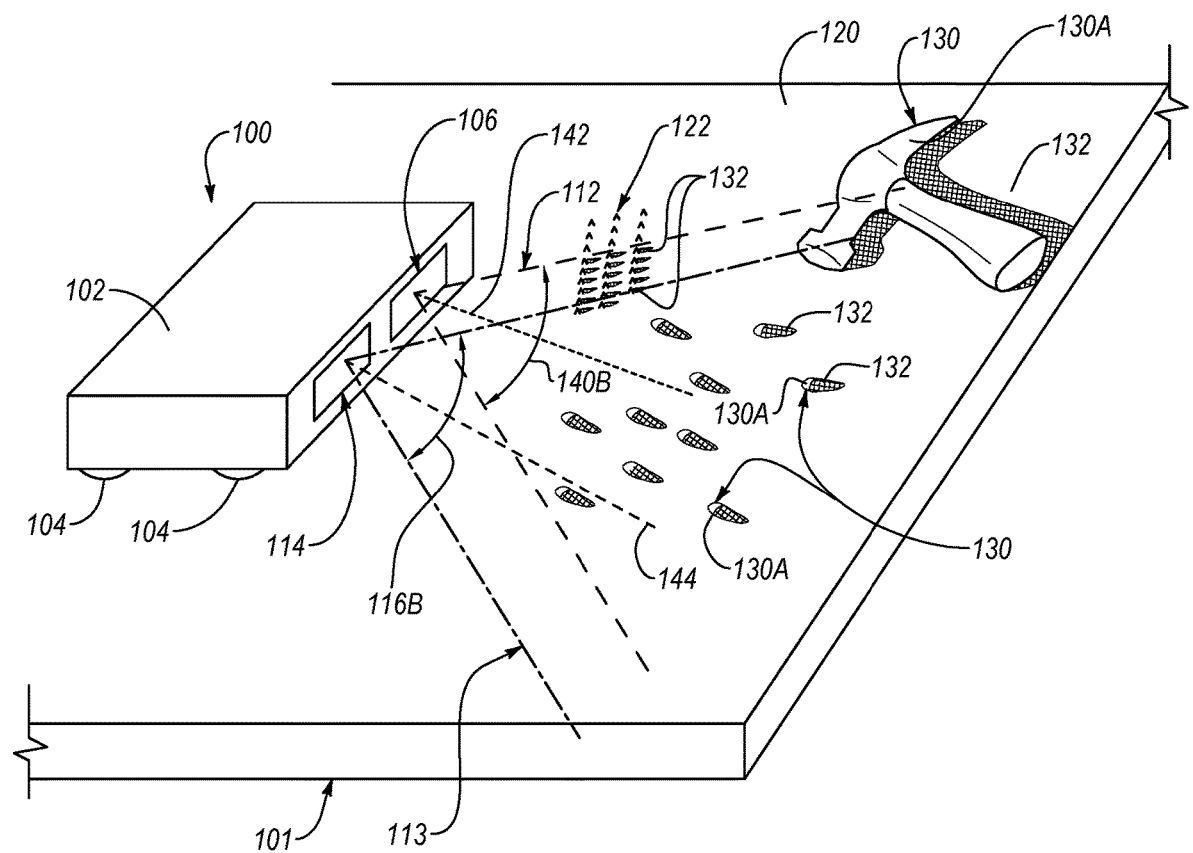
FIG. 2 is a schematic, perspective view of the apparatus of FIG. 1, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 9:
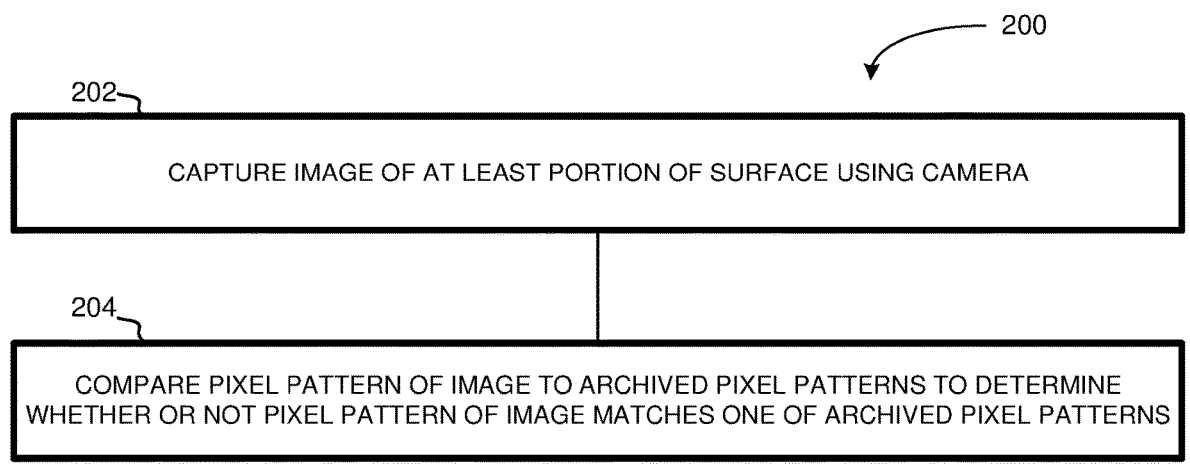
FIG. 9 is a block diagram of a method, according to one or more examples of the subject matter, disclosed herein, of identifying a surface using the apparatus of FIG. 1, according to one or more examples of the subject matter, disclosed herein.
Figure 10A:
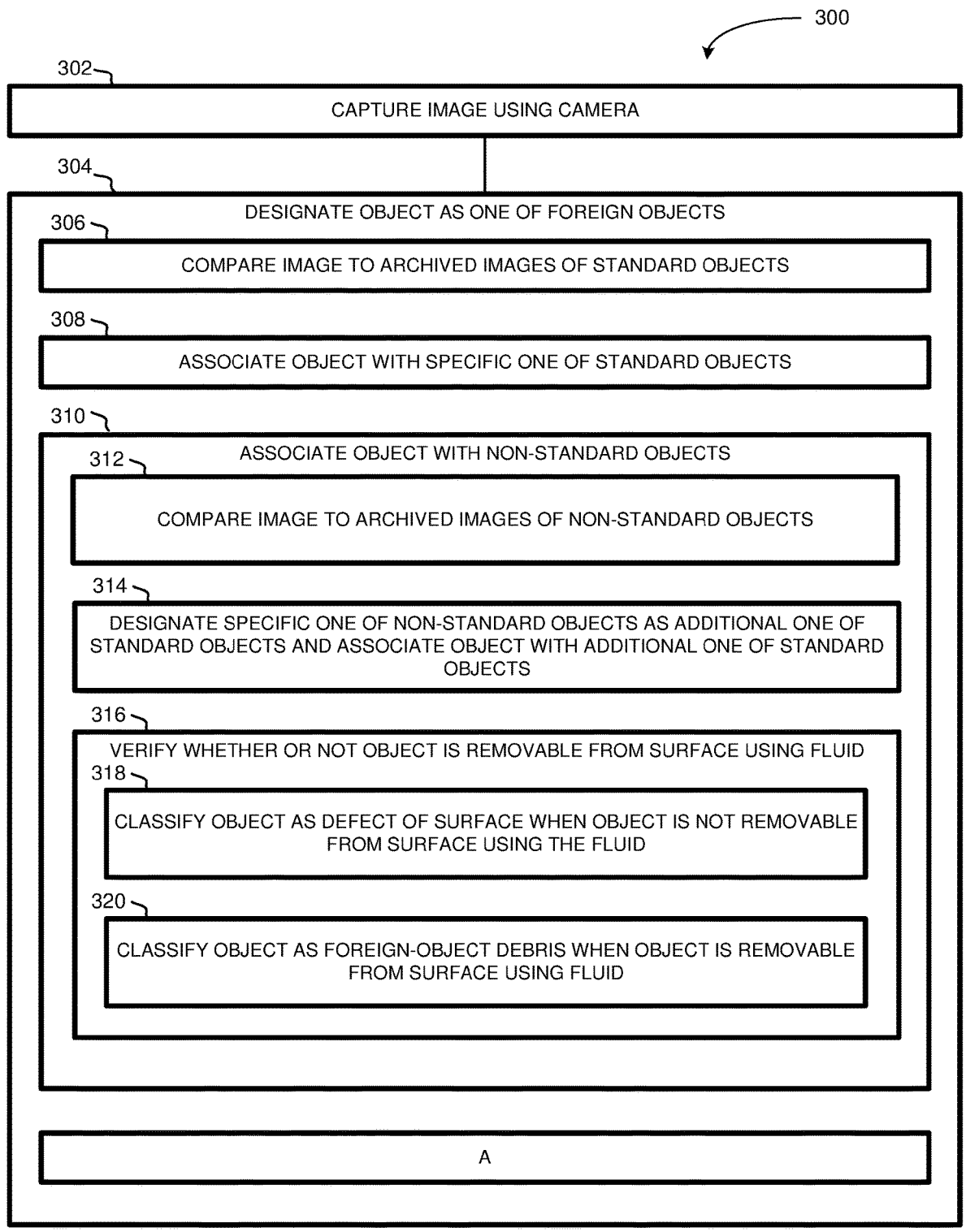
FIGS. 10A and 10B, collectively, are a block diagram of a method, according to one or more examples of the subject matter, disclosed herein, of inspecting a surface for foreign objects using the apparatus of FIG. 1, according to one or more examples of the subject matter, disclosed herein.
Figure 10B:
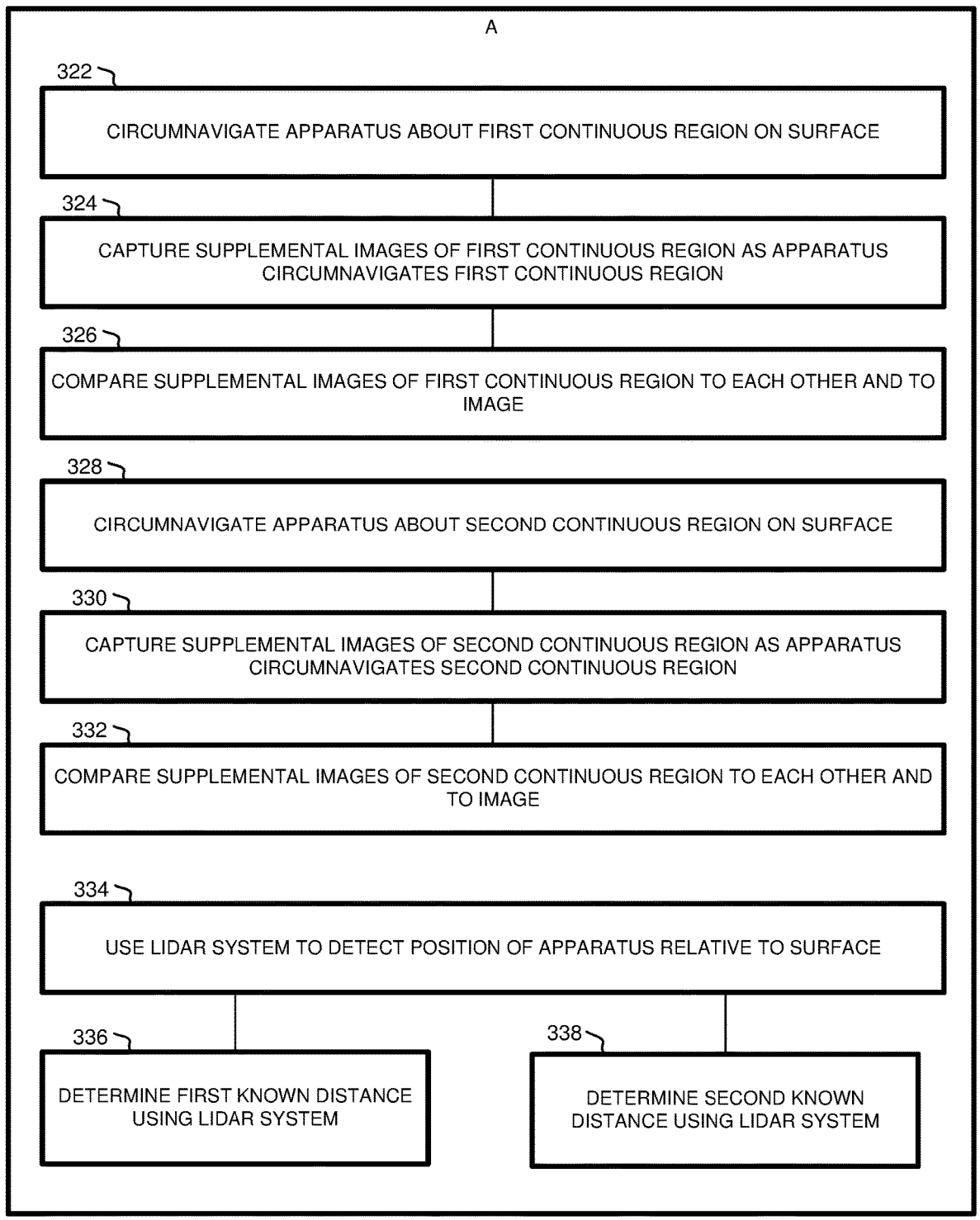

In FIGS. 9, 10A, and 10B, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9, 10A, and 10B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2-4B and 5A-8C for illustrative purposes only and not by way of limitation, the following portion of this paragraph delineates example 1 of the subject matter, disclosed herein. According to example 1, apparatus 100 for inspecting surface 120 comprises light source 106, configured to generate light beam 112, having centerline 142. Apparatus 100 also comprises camera 114, having line of sight 144. Apparatus 100 further comprises microprocessor 118, communicatively coupled with camera 114. When light beam 112 is generated by light source 106, centerline 142 of light beam 112 is coincident with line of sight 144 of camera 114 when viewed in a direction, perpendicular to first plane 150 that contains one of centerline 142 of light beam 112 or line of sight 144 of camera 114. Additionally, when light beam 112 is generated by light source 106, centerline 142 of light beam 112 is parallel to line of sight 144 of camera 114 when viewed in a direction, perpendicular to second plane 152 that is perpendicular to first plane 150 and that contains centerline 142 of light beam 112 and line of sight 144 of camera 114.

Apparatus 100 enables identification of surface 120 of part 101 and/or inspection of surface 120 of part 101 for foreign objects 130. Light source 106 helps to produce shadows and light reflections from textures in surface 120 and from foreign objects 130 on surface 120. Camera 114, having line of sight 144 that is coincident with centerline 142 of light beam 112 when viewed in a direction, perpendicular to first plane 150 that contains one of centerline 142 of light beam 112 or line of sight 144 of camera 114, and is parallel to centerline 142 of light beam 112 when viewed in the direction, perpendicular to second plane 152 that is perpendicular to first plane 150 and that contains centerline 142 of light beam 112 and line of sight 144 of camera 114, enables locating both light source 106 and camera 114 close to surface 120. First plane 150 is into the page in FIG. 4A and second plane 152 is into the page in FIG. 3A. Locating light source 106 close to surface 120 facilitates casting of enlarged shadows from the textures and/or foreign objects 130, compared to the size of the textures and/or foreign objects 130, and enhances reflections from the textures and/or foreign objects 130. Locating camera 114 close to surface promotes capturing, by camera 114, images of shadows, cast from textures in surface 120 and/or foreign objects 130 on surface 120, and light reflections from the textures in surface 120 and/or foreign objects 130 on surface 120. Microprocessor 118 facilitates processing of images captured by camera 114 for identifying and/or classifying the type of surface 120 and foreign objects 130 on surface 120.

Figure 3A:
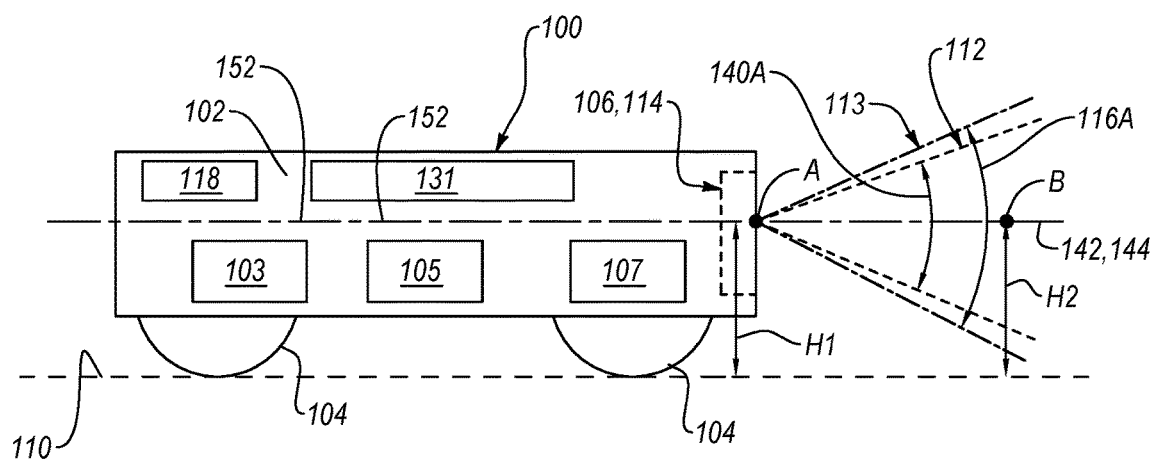
FIG. 3A is a schematic, elevation, side view of the apparatus of FIG. 1, according to one or more examples of the subject matter, disclosed herein.
Figure 3B:
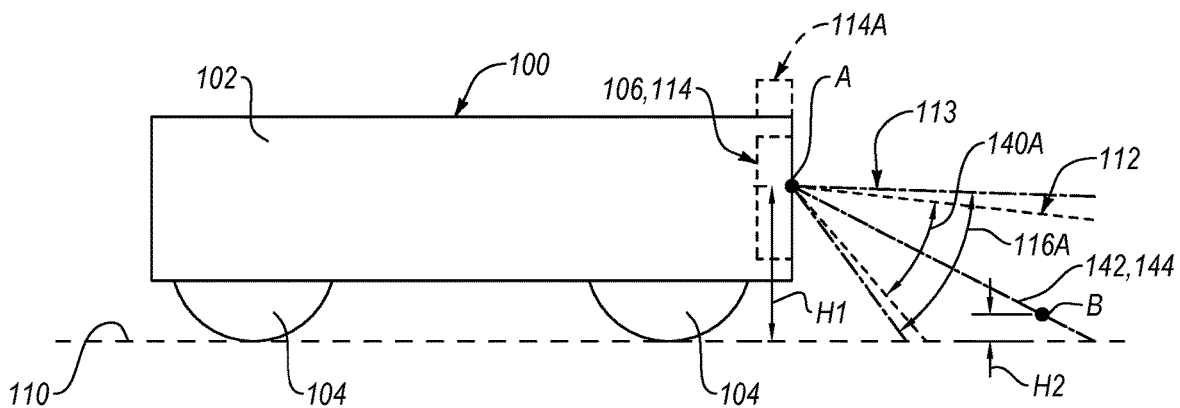
FIG. 3B is a schematic, elevation, side view of the apparatus of FIG. 1, according to one or more examples of the subject matter, disclosed herein.

According to some examples, as shown in FIG. 3B, apparatus 100 further comprises second camera 114A located above camera 114 when apparatus 100 is inspecting surface 120. Like camera 114, second camera 114A enables capturing, by second camera 114A, images of shadows, cast from textures in surface 120 and/or foreign objects 130 on surface 120, and light reflections from the textures in surface 120 and/or foreign objects 130 on surface 120. However, in some examples, second camera 114A, being higher than camera 114, when apparatus 100 is inspecting surface 120, captures images with enhanced visibility of shadows, compared to images captured by camera 114.

In some examples, referring to FIGS. 2-4B and 6A-6C, centerline 142 of light beam 112 bisects first light-beam angle 140A, which is measured in a vertical plane, in two equal parts and bisects second light-beam angle 140B, which is measured in a horizontal plane, in two equal parts. Light beam 112, generated by light source 106, has a shape, defined by the shape of a cross-section of light beam 112 along a plane that is perpendicular to centerline 142 of light beam 112. The shape of light beam 112 can be any of various shapes, such as, without limitation, circular (see, e.g., FIG. 6A), square (see, e.g., FIG. 6B), or rectangular (see, e.g., FIG. 6C). Moreover, light source 106 can be any of various types of light sources. In one example, light source 106 comprises one or more light-emitting diodes (LEDs), such as a full-spectrum LED. In one example, light source 106 comprises at least one full-spectrum LED rated at 10,000 lumens per square foot or higher. According to yet another example, light source 106 comprises at least one dimmable LED.

In some examples, referring to FIGS. 2-4B and 5A-5C, line of sight 144 of camera bisects vertical angle of view 116A of camera 114 into two equal parts and bisects horizontal angle of view 116B of camera 114 into two equal parts. Field of view 113 of camera 114 has a shape, defined by the shape of a cross-section of field of view 113 along a plane that is perpendicular to line of sight 144 of camera 114. The shape of field of view 113 of camera 114 can be any of various shapes, such as, without limitation, rectangular (see, e.g., FIG. 5A), triangular (see, e.g., FIG. 5B), or square (see, e.g., FIG. 5C). Moreover, camera 114 can be a digital camera, having an image sensor array.

Referring generally to FIG. 1 and particularly to, e.g., FIGS. 3A-4B and 6A-6C for illustrative purposes only and not by way of limitation, the following portion of this paragraph delineates example 2 of the subject matter, disclosed herein. According to example 2, which encompasses example 1, above, light beam 112 also has first light-beam angle 140A, measured in third plane 154 that contains centerline 142 and that is co-planar with or parallel to first plane 150. Light beam 112 additionally has second light-beam angle 140B, measured in second plane 152.

Light beam 112, having first light-beam angle 140A and second light-beam angle 140B, promotes vertical and horizontal illumination of textures in and foreign object 130 on surface 120 by light source 106. The shape of light beam 112 depends on one of a shape of light source 106, arrangement of multiple light-emitting devices of light source 106, or the configuration of a light filter used on conjunction with light source 106.

Figure 6A:
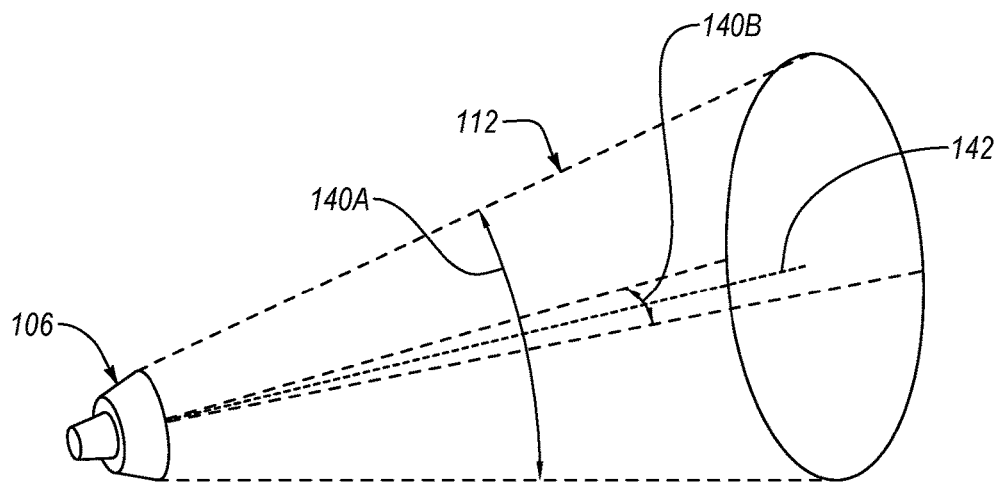
FIG. 6A is a schematic, perspective view of a light source of the apparatus of FIG. 1 and a light beam, generated by the light source, according to one or more examples of the subject matter, disclosed herein.
Figure 6B:
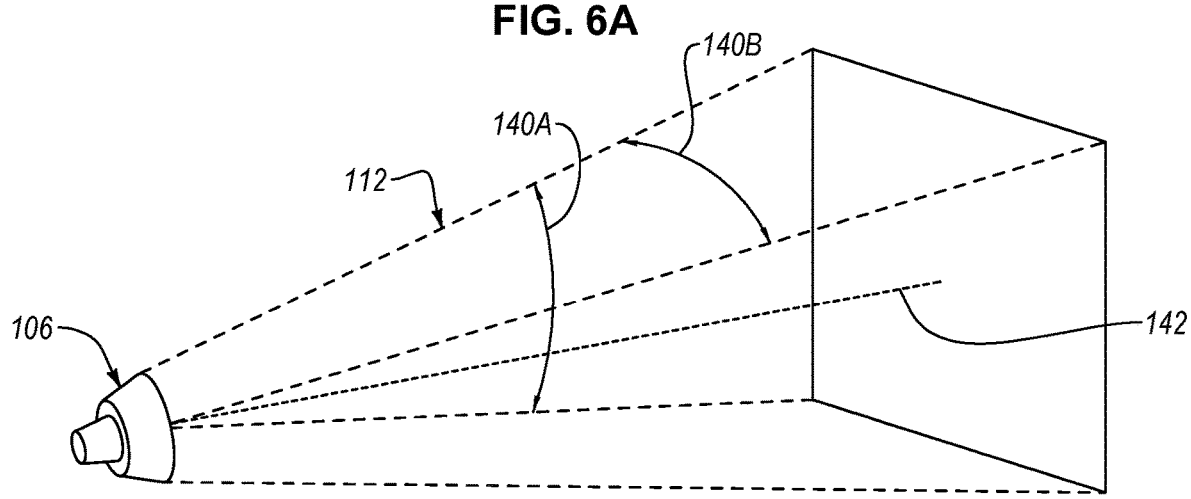
FIG. 6B is a schematic, perspective view of a light source of the apparatus of FIG. 1 and a light beam, generated by the light source, according to one or more examples of the subject matter, disclosed herein.
Figure 6C:
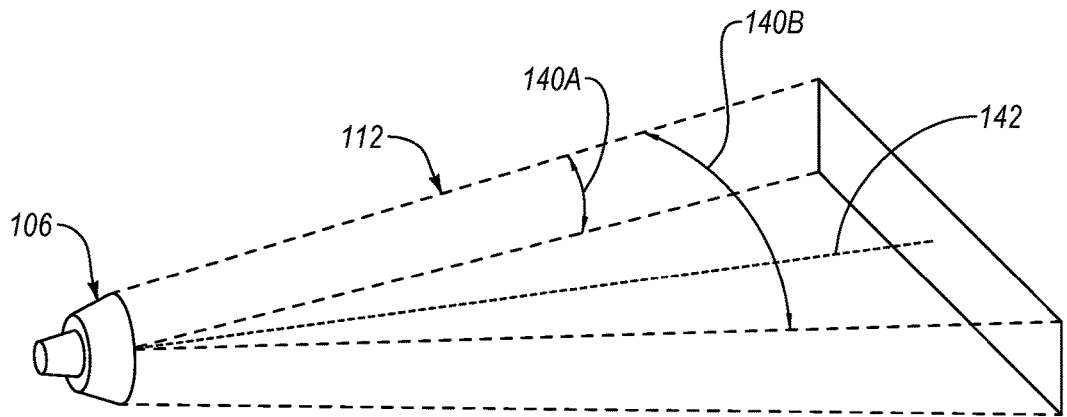
FIG. 6C is a schematic, perspective view of a light source of the apparatus of FIG. 1 and a light beam, generated by the light source, according to one or more examples of the subject matter, disclosed herein.

Referring generally to FIG. 1 and particularly to, e.g., FIG. 6C for illustrative purposes only and not by way of limitation, the following portion of this paragraph delineates example 3 of the subject matter, disclosed herein. According to example 3, which encompasses example 2, above, first light-beam angle 140A is not equal to second light-beam angle 140B.

First light-beam angle 140A and second light-beam angle 140B, being unequal, promotes efficient use of energy by enabling light beam 112 light beam 112 to illuminate only targeted areas under inspection.

Referring generally to FIG. 1 and particularly to, e.g., FIG. 6C for illustrative purposes only and not by way of limitation, the following portion of this paragraph delineates example 4 of the subject matter, disclosed herein. According to example 4, which encompasses example 3, above, first light-beam angle 140A is less than second light-beam angle 140B.

First light-beam angle 140A, being less than second light-beam angle 140B, promotes efficient use of energy by enabling light beam 112 to illuminate mostly just surface 120 under inspection.

Referring generally to FIG. 1 and particularly to, e.g., FIG. 6C for illustrative purposes only and not by way of limitation, the following portion of this paragraph delineates example 5 of the subject matter, disclosed herein. According to example 5, which encompasses example 3, above, a ratio of first light-beam angle 140A to second light-beam angle 140B is from 0.1 to 0.5.

The ratio of first light-beam angle 140A to second light-beam angle 140B, being from 0.1 to 0.5, promotes broad illumination of surface 120 in a horizontal direction, parallel to surface 120, and a narrow illumination of surface 120 in a vertical direction, perpendicular to surface 120.

Referring generally to FIG. 1 and particularly to, e.g., FIGS. 3A-4A and 5A-5C for illustrative purposes only and not by way of limitation, the following portion of this paragraph delineates example 6 of the subject matter, disclosed herein. According to example 6, which encompasses any one of examples 1 to 5, above, camera 114 also has first angle of view 116A, measured in third plane 154 that contains line of sight 144 and that is co-planar with or parallel to first plane 150. Camera 114 additionally has second angle of view 116B, measured in second plane 152.

Camera 114, having first angle of view 116A and second angle of view 116B, promotes capture of images of surface 120 and foreign objects 130 on surface 120. The shape of field of view 113 of camera 114, and thus first angle of view 116A and second angle of view 116B, is dependent on the shape and size of the image sensor array of camera 114.

Figure 5A:
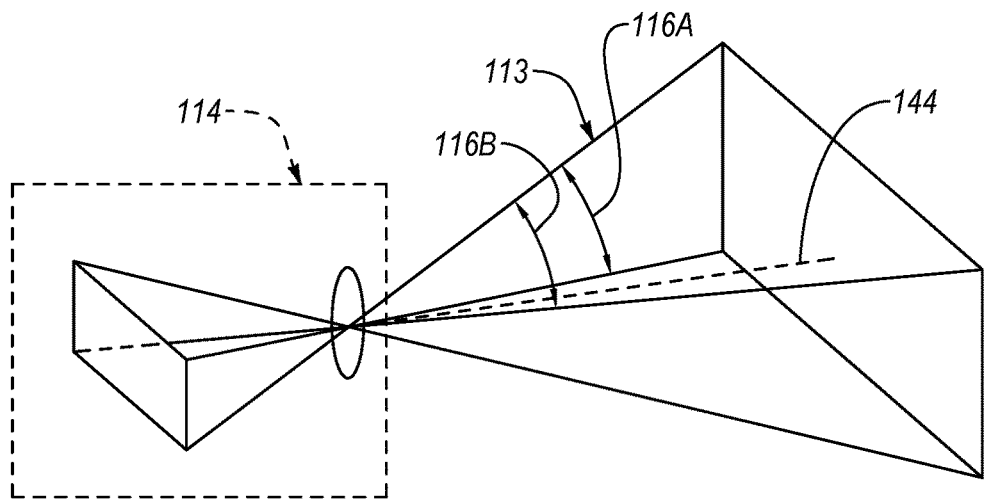
FIG. 5A is a schematic, perspective view of a camera of the apparatus of FIG. 1 and a field of view of the camera, according to one or more examples of the subject matter, disclosed herein.
Figure 5B:
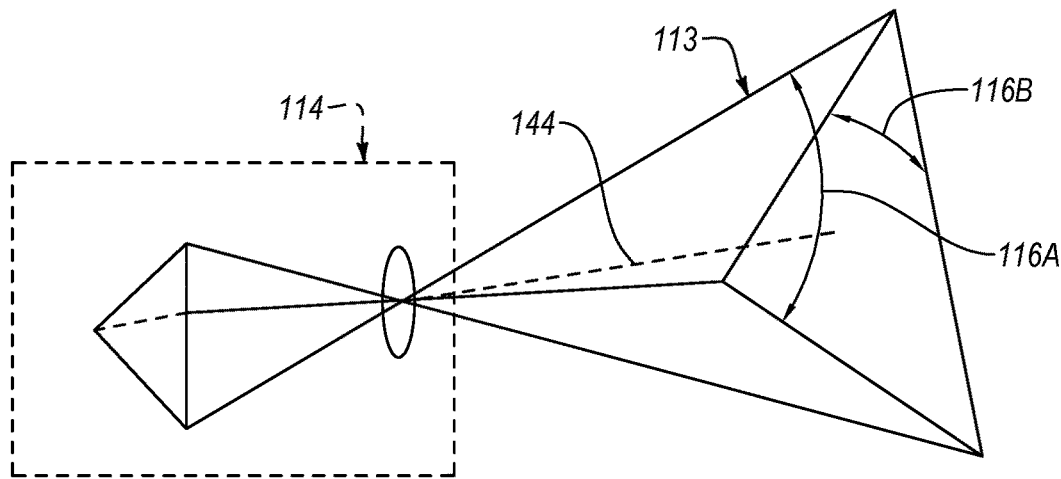
FIG. 5B is a schematic, perspective view of a camera of the apparatus of FIG. 1 and a field of view of the camera, according to one or more examples of the subject matter, disclosed herein.
Figure 5C:
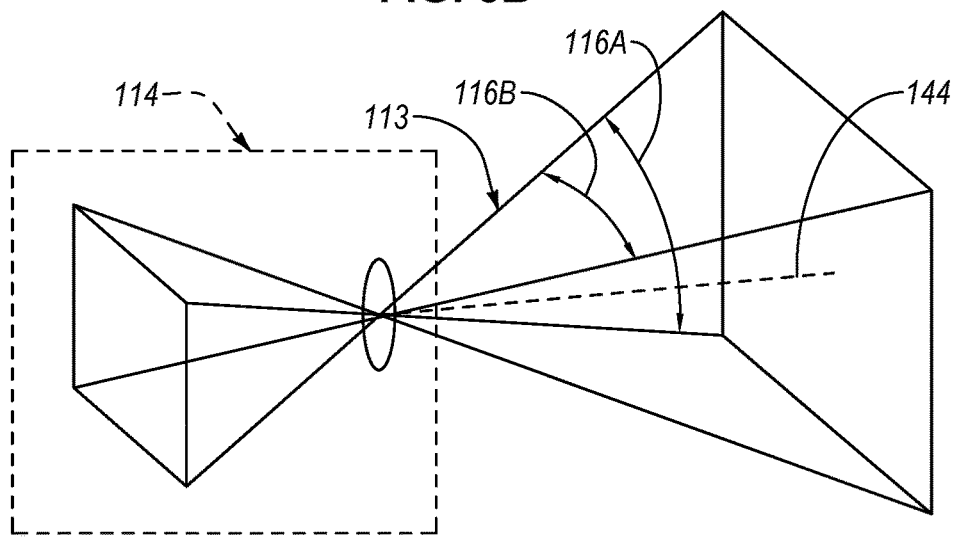
FIG. 5C is a schematic, perspective view of a camera of the apparatus of FIG. 1 and a field of view of the camera, according to one or more examples of the subject matter, disclosed herein.

Referring generally to FIG. 1 and particularly to, e.g., FIG. 5A for illustrative purposes only and not by way of limitation, the following portion of this paragraph delineates example 7 of the subject matter, disclosed herein. According to example 7, which encompasses example 6, above, first angle of view 116A is not equal to second angle of view 116B.

First angle of view 116A and second angle of view 116B, being unequal, promotes capture of images of only targeting areas under inspection, which facilitates efficient inspection by keeping non-targeted areas out of the images so that unnecessary analysis of the non-targeted areas, which would take up valuable bandwidth and processing power, is avoided.

Referring generally to FIG. 1 and particularly to, e.g., FIG. 5A for illustrative purposes only and not by way of limitation, the following portion of this paragraph delineates example 8 of the subject matter, disclosed herein. According to example 8, which encompasses example 7, above, first angle of view 116A is less than second angle of view 116B.

First angle of view 116A, being less than second angle of view 116B, promotes capture of images of only select portions of surface 120, which facilitates efficient inspection of surface 120 for identifying the type of surface 120 and/or foreign objects 130 on surface 120.

Referring generally to FIG. 1 and particularly to, e.g., FIG. 5A for illustrative purposes only and not by way of limitation, the following portion of this paragraph delineates example 9 of the subject matter, disclosed herein. According to example 9, which encompasses example 7 or 8, above, a ratio of first angle of view 116A to second angle of view 116B is from 0.1 to 0.5.

The ratio of first angle of view 116A to second angle of view 116B, being from 0.1 to 0.5, promotes capture of images of large portions of surface 120 in the horizontal direction and small portions of environmental objects that are vertically away from surface 120.

Referring generally to FIG. 1 and particularly to, e.g., FIGS. 2-4B for illustrative purposes only and not by way of limitation, the following portion of this paragraph delineates example 10 of the subject matter, disclosed herein. According to example 10, which encompasses any one of examples 1 to 9, above, apparatus 100 further comprises steerable motorized chassis 102. Light source 106 and camera 114 are coupled to steerable motorized chassis 102.

Steerable motorized chassis 102 enables automated movement of light source 106 and camera 114 relative to surface 120. Accordingly, steerable motorized chassis 102 promotes remote inspection of surface 120 without need for technician to be near surface 120 when inspected. Additionally, steerable motorized chassis 102, being small relative to a technician, enables inspection of surfaces that are difficult for a technician to access. Moreover, steerable motorized chassis 102 helps position light source 106 and camera 114 close to surface 120 for more efficient and accurate identification of the type of surface 120 and/or foreign objects 130 on surface 120.

Referring generally to FIG. 1 and particularly to, e.g., FIG. 3A for illustrative purposes only and not by way of limitation, the following portion of this paragraph delineates example 11 of the subject matter, disclosed herein. According to example 11, which encompasses example 10, above, steerable motorized chassis 102 comprises power supply 103, motor 105, and steering mechanism 107. Microprocessor 118 is communicatively coupled with power supply 103, motor 105, and steering mechanism 107.

Power supply 103, motor 105, steering mechanism 107 of steerable motorized chassis 102 enable remote control of steerable motorized chassis 102. Microprocessor, being communicatively coupled with power supply 103, motor 105, and steering mechanism 107.

Referring generally to FIG. 1 and particularly to, e.g., FIG. 3A for illustrative purposes only and not by way of limitation, the following portion of this paragraph delineates example 12 of the subject matter, disclosed herein. According to example 12, which encompasses example 11, above, steerable motorized chassis 102 further comprises wheels 104, operatively coupled with steering mechanism 107 and configured to roll along surface 120.

Wheels 104 facilitate movement of steerable motorized chassis 102 on and along a plane 110 defined by surface 120 of part 101. Moreover, wheels 104, being operatively coupled with steering mechanism 107, enable steerable motorized chassis 102 to be moved in any of various directions, relative to surface 120, during inspection of surface 120 by apparatus 100. Wheels 104 further promote positioning light source 106 and camera 114 in close proximity to surface 120.

Referring generally to FIG. 1 and particularly to, e.g., FIG. 3A for illustrative purposes only and not by way of limitation, the following portion of this paragraph delineates example 13 of the subject matter, disclosed herein. According to example 13, which encompasses any one of examples 1 to 12, above, apparatus 100 further comprises light detection and ranging (LIDAR) system 131 that is communicatively coupled with microprocessor 118.

LIDAR system 131 helps apparatus 100 navigate within an environment, in which surface 120 forms a part. LIDAR system 131 enables identification of environmental features in the environment, which helps apparatus 100 avoid areas of environment that are not under inspection, avoid collisions with environment features, and determine an inspection path along which apparatus 100 moves when inspecting surface 120. Additionally, LIDAR system 131 enables mapping and localization of foreign objects 130 identified by apparatus 100.

Referring generally to FIG. 1 and particularly to, e.g., FIGS. 2-4B and 6A-8B for illustrative purposes only and not by way of limitation, the following portion of this paragraph delineates example 14 of the subject matter, disclosed herein. According to example 14, which encompasses any one of examples 1 to 13, above, light source 106 comprises a full-spectrum light-emitting diode (LED).

Light source 106, being a full-spectrum LED, helps to illuminate surface 120 and foreign objects 130 on surface with light that covers the entire visible spectrum. Illuminating surface 120 and foreign objects 130 with light covering the entire visible spectrum enables illumination of surfaces and foreign objects 130 made of a variety of materials, thus providing an accurate spatial representation of surface 120, foreign objects 130, and the corresponding environment.

Figure 7:
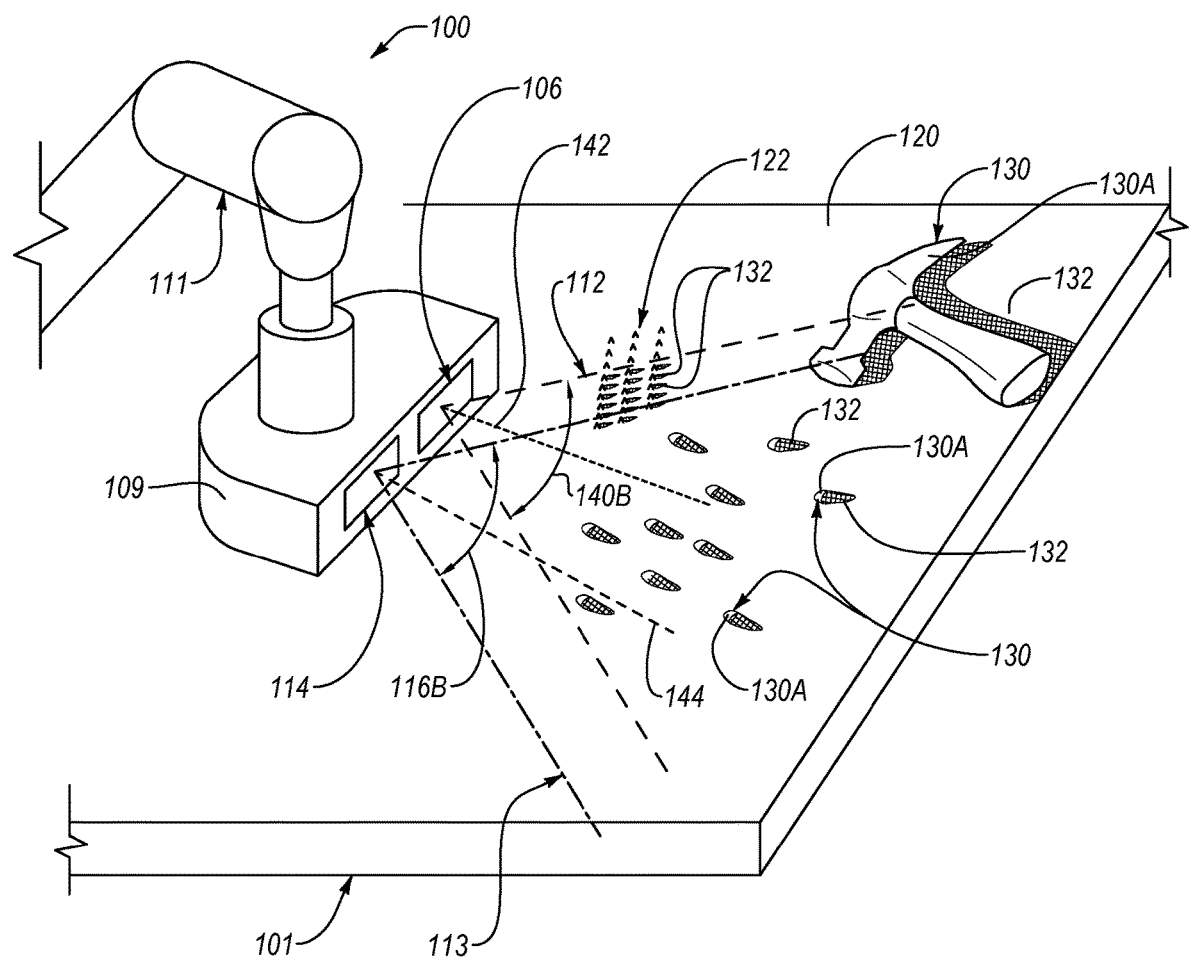
FIG. 7 is a schematic, perspective view of the apparatus of FIG. 1, according to one or more examples of the subject matter, disclosed herein.

Referring generally to FIG. 1 and particularly to, e.g., FIG. 7 for illustrative purposes only and not by way of limitation, the following portion of this paragraph delineates example 15 of the subject matter, disclosed herein. According to example 15, which encompasses any one of examples 1 to 14, above, apparatus 100 further comprises end effector 109. Light source 106 and camera 114 are coupled to end effector 109.

End effector 109 enables automated movement of light source 106 and camera 114 relative to surface 120 without contacting surface 120. In some examples, end effector 109 enables inspection of surface 120 when surface 120 would not be conducive to supporting apparatus 100 thereon. According to some examples, end effector 109 is coupled to robot 111, which facilitates movement of end effector 109 with multiple degrees of freedom.

Referring generally to FIG. 9 and particularly to, e.g., FIGS. 2-4C and 7 for illustrative purposes only and not by way of limitation, the following portion of this paragraph delineates example 16 of the subject matter, disclosed herein. According to example 16, which encompasses example 1, above, method 200 of using apparatus 100 to identify surface 120 comprises a step of (block 202) capturing an image, which comprises pixels, of at least a portion of surface 120 using camera 114, while illuminating surface 120 with light beam 112. An acute angle between centerline 142 of light beam 112 and surface 120, measured in a plane, perpendicular to surface 120 and containing centerline 142, is from 0 to 30 degrees. A grayscale value of at least one of the pixels is different than a grayscale value of at least another one of the pixels so that the pixels of the image form a pixel pattern. Method 200 also comprises a step of (block 204) comparing the pixel pattern of the image to archived pixel patterns, each corresponding to one of a plurality of different types of surfaces, to determine whether or not the pixel pattern of the image matches one of the archived pixel patterns.

Method 200 enables identification of the type of surface 120 of part 101. Illuminating surface 120 with light beam 112 helps cast shadows from surface features 122 (e.g., textures) of surface 120. Acute angle between centerline 142 of light beam 112 and surface 120, being from 0 to 30 degrees, helps ensure shadows are cast from even small surface features. The grayscale value of at least one of the pixels, being different than the grayscale value of at least another one of the pixels, provides an indication that a surface feature, casting a shadow, is present in the image. Comparing the resulting pixel pattern of the image to archived pixel patterns, to determine whether or not the pixel pattern of the image matches one of the archived pixel patterns, enables identification of the type of surface 120 as the type of surface corresponding with the matching archived pixel pattern.

Figure 4A:
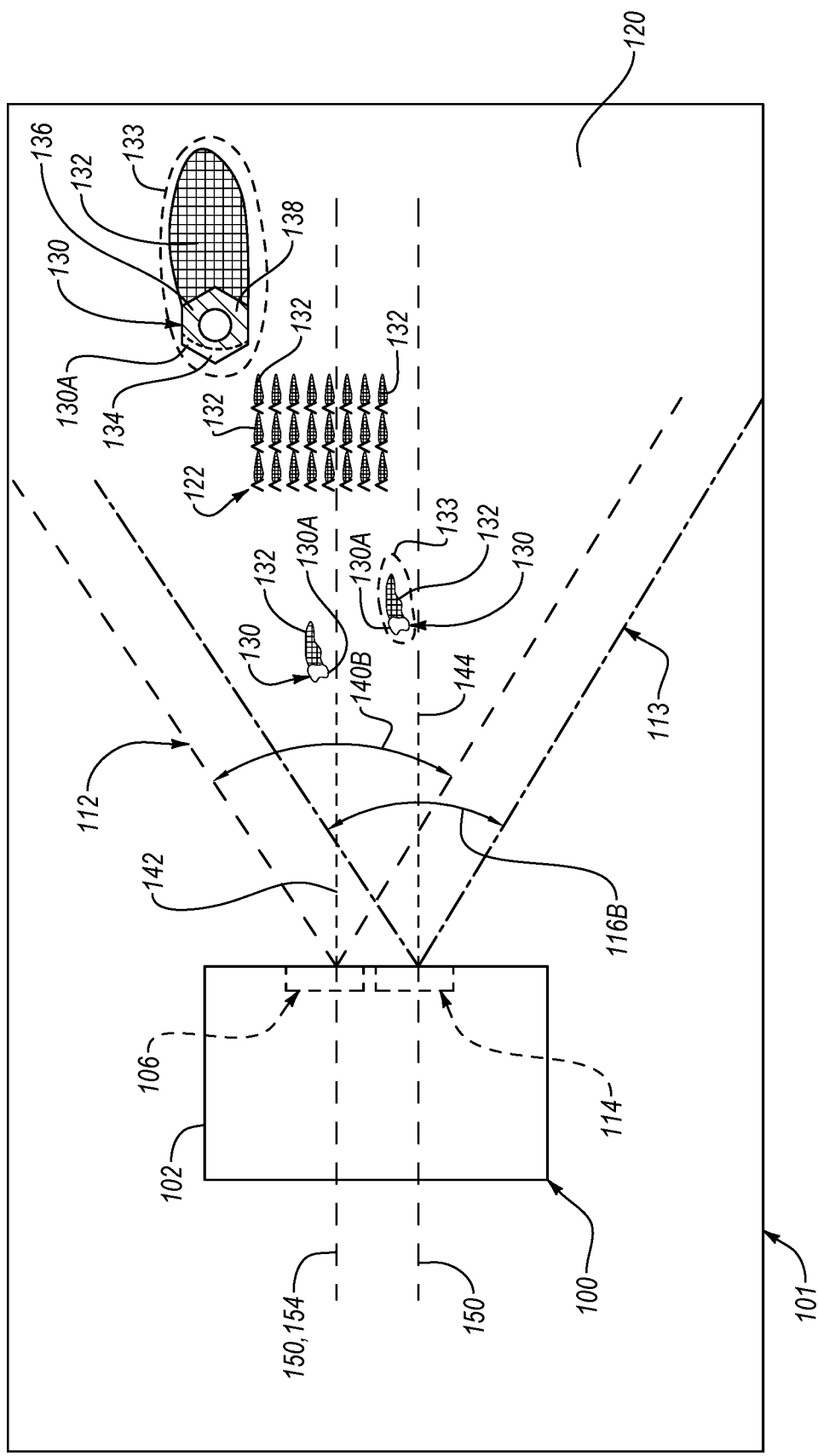
FIG. 4A is a schematic, top view of the apparatus of FIG. 1, according to one or more examples of the subject matter, disclosed herein.
Figure 4B:
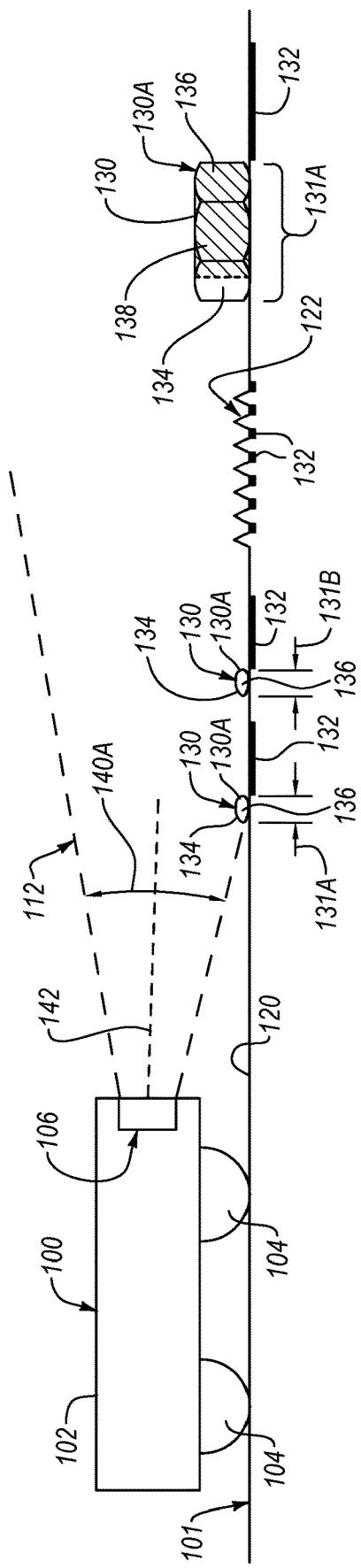
FIG. 4B is a schematic, elevation, side view of the apparatus of FIG. 1, according to one or more examples of the subject matter, disclosed herein.
Figure 4C:
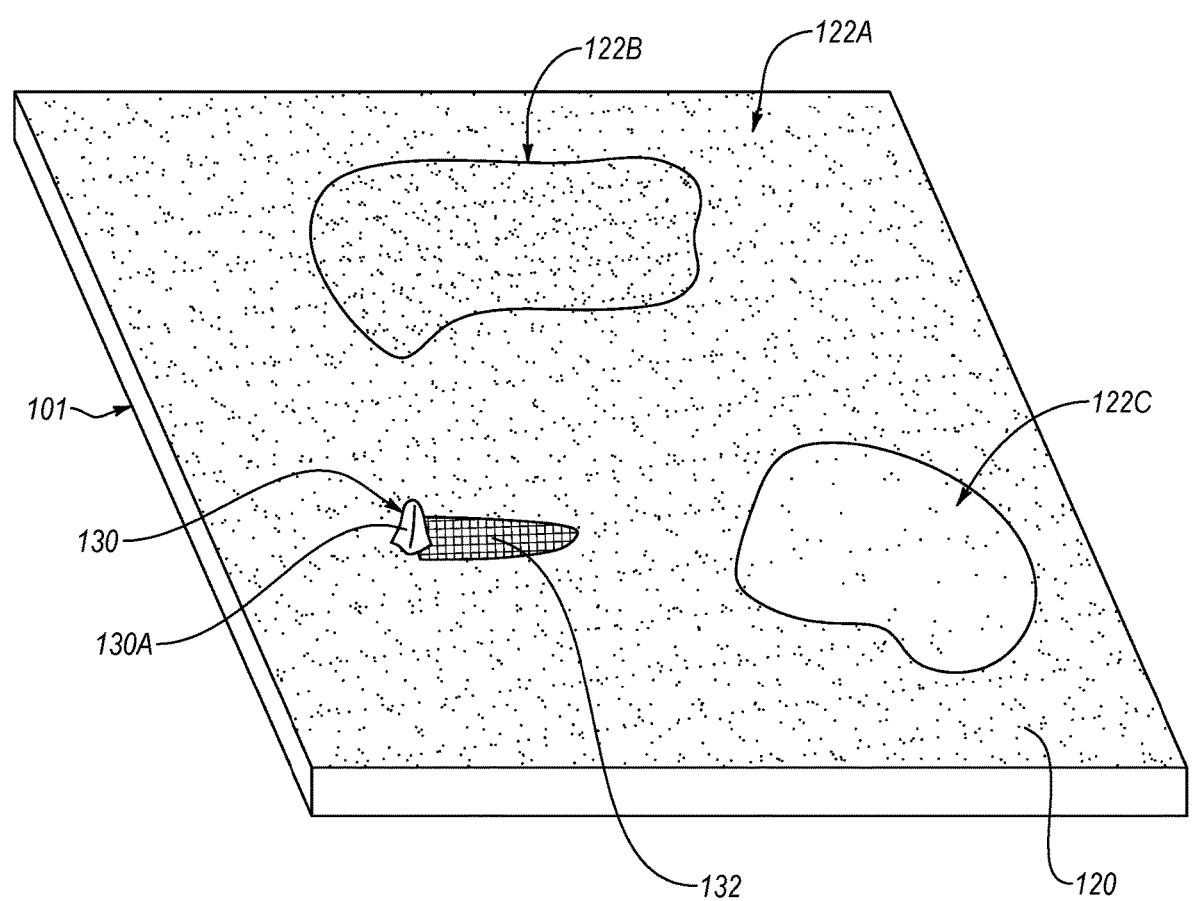
FIG. 4C is a schematic, perspective view of a surface of a part and foreign-object debris on the surface of the part, according to one or more examples of the subject matter, disclosed herein.
Figure 4D:
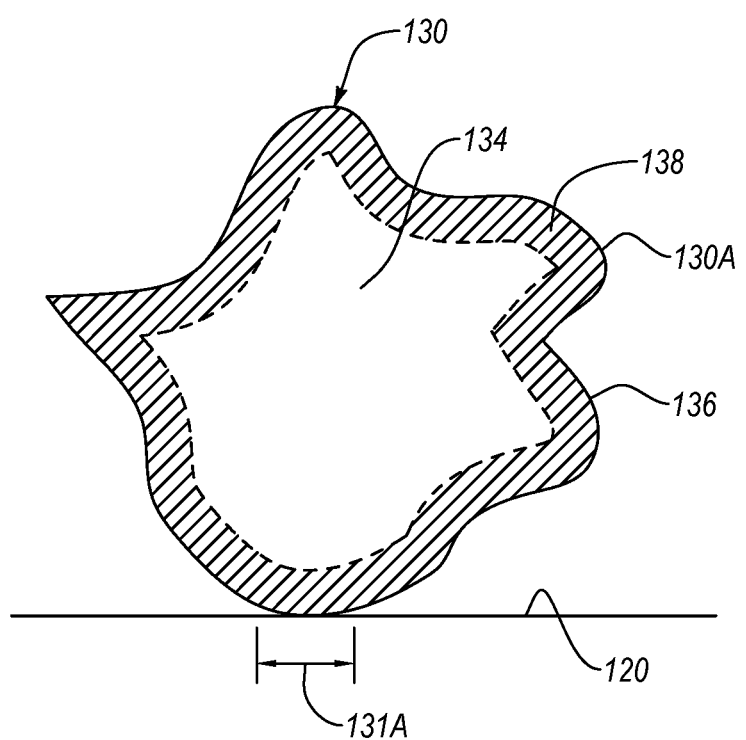
FIG. 4D is a schematic, elevation, front view of foreign-object debris on a surface, according to one or more examples of the subject matter, disclosed herein.

Each one of the archived pixel patterns is associated with a particular type of surface. The type of surface is one of a material of part 101 that defines surface 120 and/or a condition or surface finish of surface 120. The archived pixel patterns can be produced by, prior to execution of method 200, capturing images of surfaces of standard materials having various surface conditions or finishes under lighting conditions designed to match those generated during execution of method 200. For example, a part made of a fiber-reinforced polymeric material casts a particular pattern of shadows, and thus has a particular pixel pattern, that is different than the particular pattern of shadows cast from, and the corresponding particular pixel pattern of, a part made of a metallic material. In another example, as shown in FIG. 4C, part 101 can be made of the same material, but a surface finish, applied to surface 120 of part 101, may be different (e.g., surface 120 of part 102 has a first portion with first surface finish 122A, a second portion with second surface finish 122B, rougher than first surface finish 122A, and a third portion with third surface finish 122C, smoother than first surface finish 122A). In one example, first surface finish 122A can be a properly processed surface finish, second surface finish 122B can be an underprocessed surface finish, and third surface finish 122C can be an overprocessed surface finish. Accordingly, method 200 can be executed to identify whether surface 120 of part 101 has been improperly finished by comparing different pixel patterns of the image to archived pixel patterns.

Referring generally to FIG. 9 and particularly to, e.g., FIGS. 3A and 3B for illustrative purposes only and not by way of limitation, the following portion of this paragraph delineates example 17 of the subject matter, disclosed herein. According to example 17, which encompasses example 16, above, surface 120 is illuminated with light beam 112, and the image of surface 120 is captured when origin A of light beam 112 is from 1 cm to 200 cm away from surface 120.

Illuminating surface 120 with light beam 112 and capturing image of surface 120, when origin A of light beam 112 is from 1 cm to 200 cm away from surface 120 (i.e., at height H1 above surface 120 from 1 cm to 200 cm), facilitates the casting of shadows from even small surface features. Because origin A of light beam 112 is close to surface 120, shadows can be cast from surface features 122 protruding from surface 120 and surface features 122 recessed or indented in surface 120. Accordingly, method 200 enables identification of types of surfaces that form a pattern of protrusions, types of surfaces that form a pattern of indentations, or types of surfaces form a pattern of both protrusion and indentations.

As shown in FIG. 3A, when acute angle between centerline 142 of light beam 112 and surface 120 is zero, height H1 of origin A of light beam 112 is equal to second height H2 of centerline 142 of light beam 112 at location B downstream from origin A. However, as shown in FIG. 3B, when acute angle between centerline 142 of light beam 112 and surface 120 is greater than zero, height H1 of origin A of light beam 112 is greater than second height H2 of centerline 142 of light beam 112 at location B.

Referring generally to FIGS. 10A and 10B and particularly to, e.g., FIGS. 2-4D and 7-8C for illustrative purposes only and not by way of limitation, the following portion of this paragraph delineates example 18 of the subject matter, disclosed herein. According to example 18, which encompasses the subject matter of example 1, above, method 300 of using apparatus 100 to inspect surface 120 for foreign objects 130 comprises a step of (block 302) capturing an image, which comprises pixels, using camera 114, while illuminating surface 120 with light beam 112. An acute angle between centerline 142 of light beam 112 and surface 120, measured in a plane, perpendicular to surface 120 and containing centerline 142, is from 0 to 30 degrees. Method 300 also comprises a step of (block 304) designating object 130A, projecting from surface 120 and having area of contact 131A with surface 120, as one of foreign objects 130 when the image contains at least one of a first subset of the pixels, corresponding to first continuous region 132 on surface 120, or a second subset of the pixels, corresponding to second continuous region 134 on surface 136 of object 130A. First continuous region 132 on surface 120 is contiguous with object 130A. First continuous region 132 on surface 120 receives less energy from light beam 112 than does first circumferentially closed portion 133 of surface 120, circumscribing and fully bounding first continuous region 132 on surface 120 and area of contact 131A of object 130A with surface 120. Second continuous region 134 on surface 136 of object 130A reflects more energy from light beam 112 than second circumferentially closed portion 138 of surface 136 of object 130A, circumscribing and fully bounding second continuous region 134 on surface 136 of object 130A.

Method 300 enables inspection of surface 120 of part 101 for foreign objects 130, using light beam 112 of light source 106 and images captured by camera 114, to identify and designate foreign objects 130 on surface 120. Acute angle between centerline 142 of light beam 112 and surface 120, being from 0 to 30 degrees, helps ensure shadows are cast from foreign objects 130 on surface 120 and/or light is reflected off foreign objects 130 on surface 120. First subset of pixels, when contained in the image, provides a digital representation of a shadow, cast from foreign object 130 on surface 120. Second subset of pixels, when contained in the image, provides a digital representation of light reflected off foreign object 130. Accordingly, when the image contains at least one of the first subset of pixels or the second subset of pixels, the presence of object 130A on surface 120 is determined and designated as foreign object 130.

Referring generally to FIGS. 10A-10B and particularly to, e.g., FIGS. 2-4D and 7-8C for illustrative purposes only and not by way of limitation, the following portion of this paragraph delineates example 19 of the subject matter, disclosed herein. According to example 19, which encompasses example 18, above, when object 130A, projecting from surface 120, is designated as one of foreign objects 130, method 300 further comprises steps of (block 306) comparing the image to archived images of standard objects, (block 308) associating object 130A with the specific one of the standard objects when at least one of the first subset of the pixels or the second subset of the pixels of the image matches a subset of pixels of one of the archived images that corresponds to a specific one of the standard objects, and (block 310) initially associating object 130A with non-standard objects, which are different from one another and from any one of the standard objects, when neither the first subset of the pixels nor the second subset of the pixels of the image matches a subset of pixels of any of the archived images of the standard objects.

Comparing the image to the archived images of standard objects enables object 130A to be associated with either a standard object or a non-standard object. The archived images of standard objects can be produced by, prior to execution of method 300, capture images of standard objects (e.g., hammers, nails, staples, nuts, washers, o-rings, etc.) under lighting conditions designed to match those generated during execution of method 300.

Referring generally to FIGS. 10A and 10B and particularly to, e.g., FIGS. 2-4D and 7-8C for illustrative purposes only and not by way of limitation, the following portion of this paragraph delineates example 20 of the subject matter, disclosed herein. According to example 20, which encompasses example 19, above, when object 130A is initially associated with the non-standard objects, method 300 further comprises steps of (block 312) comparing the image to archived images of non-standard objects, and (block 314) designating the specific one of the non-standard objects as an additional one of the standard objects and associating object 130A with the additional one of the standard objects when at least one of the first subset of the pixels or the second subset of the pixels of the image matches a subset of pixels of one of the archived images that corresponds to a specific one of the non-standard objects.

Comparing the image to the archived images of non-standard objects and associating object 130A with the additional one of the standard objects provides machine learning capability to expand the archived images of standard objects, which improves accuracy and efficiency of method 300 as method 300 is repeatedly executed.

Referring generally to FIGS. 10A and 10B and particularly to, e.g., FIGS. 2-4D and 7-8C for illustrative purposes only and not by way of limitation, the following portion of this paragraph delineates example 21 of the subject matter, disclosed herein. According to example 21, which encompasses example 20, above, method 300 further comprises a step of (block 316) verifying whether or not object 130A is removable from surface 120 using a fluid when object 130A is associated with the non-standard objects.

Verifying whether or not object 130A is removable from surface 120, after association of object 130A with the non-standard objects, helps to confirm that object 130A is foreign-object debris and not a defect of surface 120. The fluid can be any of various fluids, such as, for example, water, cleaning solution, air, and the like, and the process of attempting to remove object 130A can be any of various process, such as directing a stream of the fluid, from a high-pressure fluid source, at the object 130A. In some examples, apparatus 100 includes features capable of directing the fluid at object 130A. In other examples, a tool, separate from apparatus 100, is used to direct the fluid at object 130A. Verification of whether or not object 130A has been removed can be accomplished by executing method 300 to capture a second image of surface 120 at mapped location of object 130A and to determine if the first subset of the pixels or the second subset of pixels is contained in the second image. The mapped location of object 130A can be determined using LIDAR system 131.

Referring generally to FIGS. 10A and 10B and particularly to, e.g., FIGS. 2-4D and 7-8C for illustrative purposes only and not by way of limitation, the following portion of this paragraph delineates example 22 of the subject matter, disclosed herein. According to example 22, which encompasses example 21, above, method 300 further comprises a step of (block 318) classifying object 130A, when associated with non-standard objects, as a defect of surface 120 when object 130A is not removable from surface 120 using the fluid.

Classifying object 130A as defect of surface 120 helps confirm object 130A is not foreign-object debris and provides opportunity to fix defect on part 101 or adjust manufacturing parameters when manufacturing future parts.

Referring generally to FIGS. 10A and 10B and particularly to, e.g., FIGS. 2-4D and 7-8C for illustrative purposes only and not by way of limitation, the following portion of this paragraph delineates example 23 of the subject matter, disclosed herein. According to example 23, which encompasses example 21, above, method 300 further comprises a step of (block 320) classifying object 130A, when associated with non-standard objects, as foreign-object debris when object 130A is removable from surface 120 using the fluid.

Classifying object 130A as foreign-object debris helps confirm that object 130A is not a defect of part 101 and has been removed from part.

Referring generally to FIGS. 10A and 10B and particularly to, e.g., FIGS. 2-4D and 7-8C for illustrative purposes only and not by way of limitation, the following portion of this paragraph delineates example 24 of the subject matter, disclosed herein. According to example 24, which encompasses any one of examples 18 to 23, above, the first subset of the pixels has a maximum grayscale value. The second subset of the pixels has a minimum grayscale value. The minimum grayscale value of the second subset of the pixels is greater than the maximum grayscale value of the first subset of the pixels.

Minimum grayscale value of the second subset of the pixels, being greater than the maximum grayscale value of the first subset of the pixels, enables first continuous region 132 to be associated with a shadow, cast from object 130A, and second continuous region 134 to be associated with a reflection of light from object 130A. For a black and white image, the higher the grayscale value of a pixel of the image, the lighter the pixel. In contrast, the lower the grayscale value of a pixel of the image, the darker the pixel.

Referring generally to FIGS. 10A and 10B and particularly to, e.g., FIGS. 2-4D and 7-8C for illustrative purposes only and not by way of limitation, the following portion of this paragraph delineates example 25 of the subject matter, disclosed herein. According to example 25, which encompasses example 24, above, the maximum grayscale value is from 0 to 100. The minimum grayscale value is from 200 to 255.

The maximum grayscale value, being from 0 to 100, enables the first continuous region 132 to be accurately associated with a shadow. The minimum grayscale value, being from 200 to 255, enables the second continuous region 134 to be accurately associated with a reflection of light. As used herein, the grayscale used to denote the darkness and lightness of pixels of the image ranges from 0, being the darkest a pixel can be, to 255, being the lightest a pixel can be.

Referring generally to FIGS. 10A and 10B and particularly to, e.g., FIGS. 2-4D and 7-8C for illustrative purposes only and not by way of limitation, the following portion of this paragraph delineates example 26 of the subject matter, disclosed herein. According to example 26, which encompasses example 25, above, the maximum grayscale value is 50. The minimum grayscale value is 238.

The maximum grayscale value, being from 50, enables the first continuous region 132 to be more accurately associated with a shadow. The minimum grayscale value, being 238 enables the second continuous region 134 to be more accurately associated with a reflection of light.

Figure 8A:
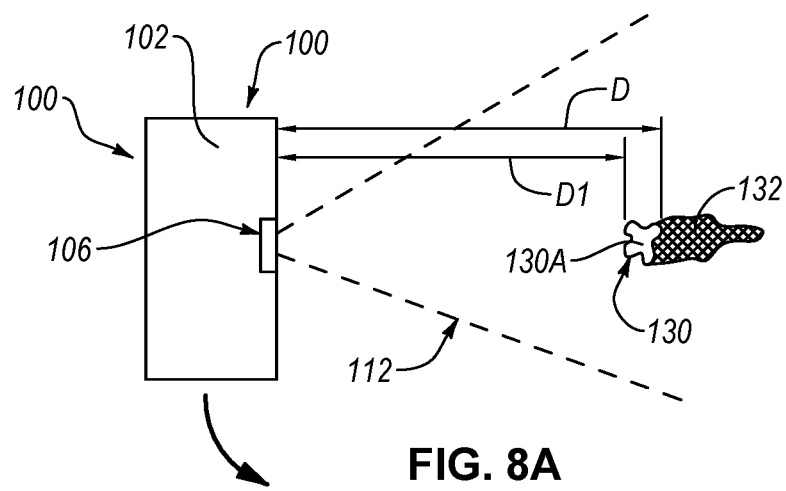
FIG. 8A is a schematic, top view of the apparatus of FIG. 1, according to one or more examples of the subject matter, disclosed herein.
Figure 8B:
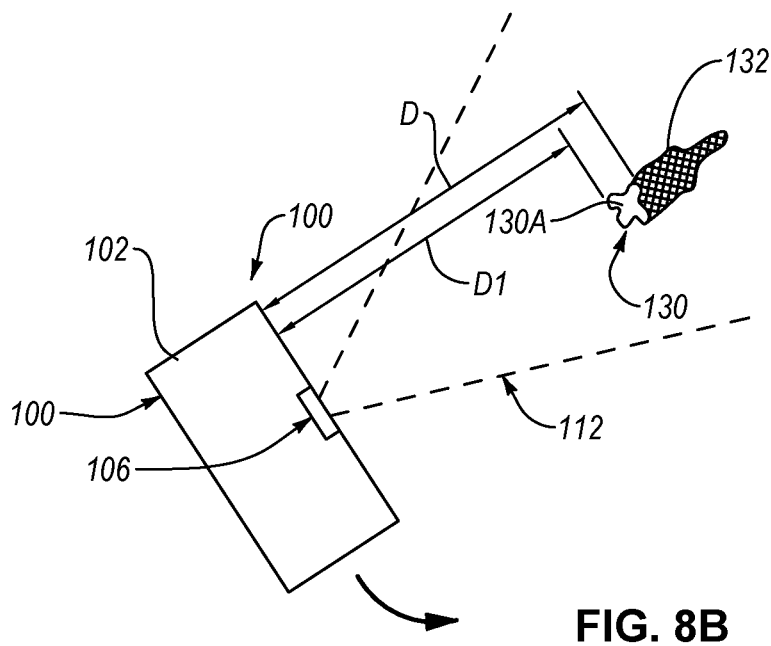
FIG. 8B is a schematic, top view of the apparatus of FIG. 1, according to one or more examples of the subject matter, disclosed herein.
Figure 8C:
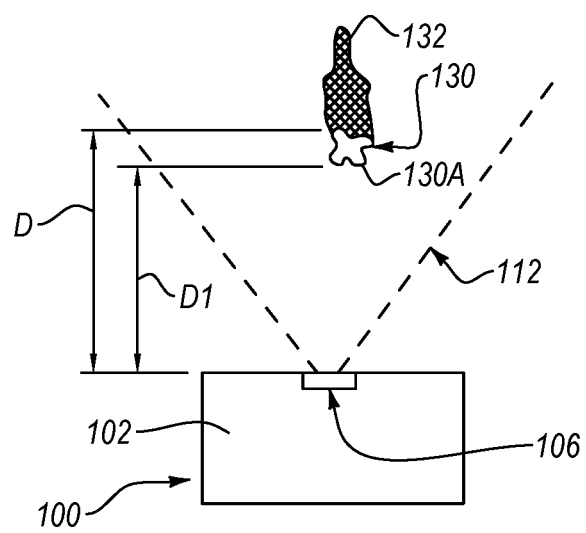
FIG. 8C is a schematic, top view of the apparatus of FIG. 1, according to one or more examples of the subject matter, disclosed herein.

Referring generally to FIGS. 10A and 10B and particularly to, e.g., FIGS. 8A-8C for illustrative purposes only and not by way of limitation, the following portion of this paragraph delineates example 27 of the subject matter, disclosed herein. According to example 27, which encompasses any one of examples 18 to 26, above, method 300 further comprises steps of, when the image contains the first subset of the pixels, (block 322) circumnavigating apparatus 100 about first continuous region 132 on surface 120 while illuminating surface 120 with light beam 112 of apparatus 100, (block 324) capturing supplemental images of first continuous region 132 on surface 120, using camera 114 of apparatus 100, as apparatus 100 circumnavigates first continuous region 132 on surface 120, and (block 326) comparing the supplemental images of first continuous region 132 on surface 120 to each other and to the image having the first subset of the pixels. Method 300 further comprises steps of, when the image contains the second subset of the pixels, (block 328) circumnavigating apparatus 100 about second continuous region 134 on surface 136 of object 130A while illuminating surface 120 with light beam 112 of apparatus 100, (block 330) capturing supplemental images of second continuous region 134 on surface 136 of object 130A, using camera 114 of apparatus 100, as apparatus 100 circumnavigates second continuous region 134 on surface 136 of object 130A, and (block 332) comparing the supplemental images of second continuous region 134 on surface 136 of object 130A to each other and to the image having the second subset of the pixels.

Circumnavigating apparatus 100 about first continuous region 132, capturing supplemental images of first continuous region 132, and comparing supplemental images of first continuous region 132 to each other and to the image, having the first subset of the pixels, helps confirm that the image contains the first subset of the pixels. When the image contains the first subset of the pixels, it is expected that the supplemental images will include first continuous regions 132 having pixels similar to the first subset of the pixels. When each one of the supplemental images includes first continuous region 132 having pixels similar to the first subset of the pixels, then a determination that the initial image has the first subset of the pixels can be considered accurate. However, when one or more of the supplemental images includes first continuous region 132 with pixels that are dissimilar to the first subset of the pixels, then the determination that the image has the first subset of the pixels can be considered inaccurate.

Circumnavigating apparatus 100 about second continuous region 134, capturing supplemental images of second continuous region 134, and comparing supplemental images of second continuous region 134 to each other and to the image, having the first subset of the pixels, helps confirm that the image contains the second subset of the pixels. When the image contains the second subset of the pixels, it is expected that the supplemental images will include second continuous regions 134, having pixels similar to the second subset of the pixels. When each one of the supplemental images includes second continuous region 134 having pixels similar to the second subset of the pixels, then a determination that the image has the second subset of the pixels can be considered accurate. However, when one or more of the supplemental images includes second continuous region 134 with pixels that are dissimilar to the second subset of the pixels, then the determination that the image has the second subset of the pixels can be considered inaccurate.

Referring generally to FIGS. 10A and 10B and particularly to, e.g., FIGS. 3A and 8A-8C for illustrative purposes only and not by way of limitation, the following portion of this paragraph delineates example 28 of the subject matter, disclosed herein. According to example 28, which encompasses example 27, above, either the step of (block 322) circumnavigating apparatus 100 about first continuous region 132 on surface 120 or the step of (block 328) circumnavigating apparatus 100 about second continuous region 134 on surface 120 comprises (block 334) using light detection and ranging (LIDAR) system 131 to detect a position of apparatus 100 relative to surface 120.

Using LIDAR system 131 to detect the position of apparatus 100 relative to surface 120 enables apparatus 100 to circumnavigate about first continuous region 132 and/or second continuous region 134 without colliding with object 130A.

Referring generally to FIGS. 10A and 10B and particularly to, e.g., FIGS. 8A-8C for illustrative purposes only and not by way of limitation, the following portion of this paragraph delineates example 29 of the subject matter, disclosed herein. According to example 29, which encompasses example 27, above, when the image contains the first subset of the pixels and camera 114 is first known distance D away from first continuous region 132 on surface 120, apparatus 100 captures the image, having the first subset of the pixels, and apparatus 100 circumnavigates first continuous region 132 on surface 120 such that camera 114 remains first known distance D away from first continuous region 132 on surface 120, and such that camera 114 captures the supplemental images of first continuous region 132 on surface 120. When the image contains the second subset of the pixels and camera 114 is second known distance D1 away from second continuous region 134 on surface 136 of object 130A, apparatus 100 captures the image having the second subset of the pixels, and apparatus 100 circumnavigates second continuous region 134 on surface 136 of object 130A such that camera 114 remains second known distance D1 away from second continuous region 134 on surface 136 of object 130A, and such that camera 114 captures the supplemental images of second continuous region 134 on surface 136 of object 130A.

Circumnavigating apparatus 100 about first continuous region 132 such that camera 114 captures the supplemental images of first continuous region 132 when camera 114 is first known distance D away from first continuous region 132 enables conditions that promote an accurate comparison between first continuous region 132 in each one of the supplemental images and first continuous region 132 of the image, having the first subset of the pixels. Circumnavigating apparatus 100 about second continuous region 134 such that camera 114 captures the supplemental images of second continuous region 134 when camera 114 is second known distance D1 away from second continuous region 134 enables conditions that promote an accurate comparison between second continuous region 134 in each one of the supplemental images and second continuous region 134 of the image, having the second subset of the pixels.

Referring generally to FIGS. 10A and 10B and particularly to, e.g., FIGS. 3A and 8A-8C for illustrative purposes only and not by way of limitation, the following portion of this paragraph delineates example 30 of the subject matter, disclosed herein. According to example 30, which encompasses example 29, above, either the step of (block 322) circumnavigating apparatus 100 about first continuous region 132 on surface 120 or the step of (block 328) circumnavigating apparatus 100 about second continuous region 134 on surface 120 comprises (block 334) using light detection and ranging (LIDAR) system 131 to detect a position of apparatus 100 relative to surface 120. Method 300 further comprises steps of (block 336) determining first known distance D using LIDAR system 131 when the image contains the first subset of the pixels and (block 338) determining second known distance D1 using LIDAR system 131 when the image contains the second subset of the pixels.

Using LIDAR system 131 to detect the position of apparatus 100 relative to surface 120 and to determine first known distance D enables apparatus 100 to circumnavigate about first continuous region 132 without colliding with object 130A. Similarly, using LIDAR system 131 to detect the position of apparatus 100 relative to surface 120 and to determine second known distance D1 enables apparatus 100 to circumnavigate about second continuous region 134 without colliding with object 130A.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. An apparatus (100) for inspecting a surface (120), the apparatus (100) comprising:
    a light source (106), configured to generate a light beam (112), having a centerline (142);
    a camera (114), having a line of sight (144); and
    a microprocessor (118), communicatively coupled with the camera (114),
    wherein, when the light beam (112) is generated by the light source (106):
        the centerline (142) of the light beam (112) is coincident with the line of sight (144) of the camera (114) when viewed in a direction, perpendicular to a first plane (150) that contains one of the centerline (142) of the light beam (112) or the line of sight (144) of the camera (114); and
        the centerline (142) of the light beam (112) is parallel to the line of sight (144) of the camera (114) when viewed in a direction, perpendicular to a second plane (152) that is perpendicular to the first plane (150) and that contains the centerline (142) of the light beam (112) and the line of sight (144) of the camera (114).

2. The apparatus (100) according to claim 1, wherein the light beam (112) also has:
    a first light-beam angle (140A), measured in a third plane (154) that contains the centerline (142) and that is co-planar with or parallel to the first plane (150), and
    a second light-beam angle (140B), measured in the second plane (152).

3. The apparatus (100) according to claim 2, wherein the first light-beam angle (140A) is not equal to the second light-beam angle (140B).

4. The apparatus (100) according to claim 3, wherein the first light-beam angle (140A) is less than the second light-beam angle (140B).

5. The apparatus (100) according to claim 1, wherein the camera (114) also has:
    an first angle of view (116A), measured in a third plane (154) that contains the line of sight (144) and that is co-planar with or parallel to the first plane (150); and
    a second angle of view (116B), measured in the second plane (152).

6. The apparatus (100) according to claim 1, further comprising a steerable motorized chassis (102), wherein the light source (106) and the camera (114) are coupled to the steerable motorized chassis (102).

7. The apparatus (100) according to claim 6, wherein:
    the steerable motorized chassis (102) comprises a power supply (103), a motor (105), and a steering mechanism (107); and
    the microprocessor (118) is communicatively coupled with the power supply (103), the motor (105), and the steering mechanism (107).

8. The apparatus (100) according to claim 7, wherein the steerable motorized chassis (102) further comprises wheels (104), operatively coupled with the steering mechanism (107) and configured to roll along the surface (120).

9. The apparatus (100) according to claim 1, further comprising a light detection and ranging (LIDAR) system (131) that is communicatively coupled with the microprocessor (118).

10. The apparatus (100) according to claim 1, wherein the light source (106) comprises a full-spectrum light-emitting diode (LED).

11. The apparatus (100) according to claim 1, further comprising an end effector (109), wherein the light source (106) and the camera (114) are coupled to the end effector (109).

12. A method (200) of using the apparatus (100) of claim 1 to identify the surface (120), the method (200) comprising steps of:
    while illuminating the surface (120) with the light beam (112), capturing an image, which comprises pixels, of at least a portion of the surface (120) using the camera (114), wherein:
        an acute angle between the centerline (142) of the light beam (112) and the surface (120), measured in a plane, perpendicular to the surface (120) and containing the centerline (142), is from 0 to 30 degrees; and
        a grayscale value of at least one of the pixels is different than a grayscale value of at least another one of the pixels so that the pixels of the image form a pixel pattern; and
    comparing the pixel pattern of the image to archived pixel patterns, each corresponding to one of a plurality of different types of surfaces, to determine whether or not the pixel pattern of the image matches one of the archived pixel patterns.

13. A method (300) of using the apparatus (100) according to claim 1 to inspect the surface (120) for foreign objects (130), the method (200) comprising steps of:
    while illuminating the surface (120) with the light beam (112), capturing an image, which comprises pixels, using the camera (114), wherein an acute angle between the centerline (142) of the light beam (112) and the surface (120), measured in a plane, perpendicular to the surface (120) and containing the centerline (142), is from 0 to 30 degrees; and
    designating an object (130A), projecting from the surface (120) and having an area of contact (131A) with the surface (120), as one of the foreign objects (130) when the image contains at least one of:
        a first subset of the pixels, corresponding to a first continuous region (132) on the surface (120), wherein:
            the first continuous region (132) on the surface (120) is contiguous with the object (130A); and the first continuous region (132) on the surface (120) receives less energy from the light beam (112) than does a first circumferentially closed portion (133) of the surface (120), circumscribing and fully bounding the first continuous region (132) on the surface (120) and the area of contact (131A) of the object (130A) with the surface (120); or a second subset of the pixels, corresponding to a second continuous region (134) on a surface (136) of the object (130A), wherein the second continuous region (134) on the surface (136) of the object (130A) reflects more energy from the light beam (112) than a second circumferentially closed portion (138) of the surface (136) of the object (130A), circumscribing and fully bounding the second continuous region (134) on the surface (136) of the object (130A).

14. The method (300) according to claim 13, wherein when the object (130A), projecting from the surface (120), is designated as one of the foreign objects (130), the method (300) further comprises steps of:

comparing the image to archived images of standard objects;

when at least one of the first subset of the pixels or the second subset of the pixels of the image matches a subset of pixels of one of the archived images that corresponds to a specific one of the standard objects, associating the object (130A) with the specific one of the standard objects; and when neither the first subset of the pixels nor the second subset of the pixels of the image matches a subset of pixels of any of the archived images of the standard objects, initially associating the object (130A) with non-standard objects, which are different from one another and from any one of the standard objects.

15. The method (300) according to claim 14, wherein, when the object (130A) is initially associated with the non-standard objects, further comprising steps of:

comparing the image to archived images of non-standard objects; and when at least one of the first subset of the pixels or the second subset of the pixels of the image matches a subset of pixels of one of the archived images that corresponds to a specific one of the non-standard objects, designating the specific one of the non-standard objects as an additional one of the standard objects and associating the object (130A) with the additional one of the standard objects.

16. The method (300) according to claim 15, further comprising a step of verifying whether or not the object (130A) is removable from the surface (120) using a fluid when the object (130A) is associated with the non-standard objects.

17. The method (300) according to claim 13, further comprising steps of:

when the image contains the first subset of the pixels:
circumnavigating the apparatus (100) about the first continuous region (132) on the surface (120) while illuminating the surface (120) with the light beam (112) of the apparatus (100);
capturing supplemental images of the first continuous region (132) on the surface (120), using the camera (114) of the apparatus (100), as the apparatus (100) circumnavigates the first continuous region (132) on the surface (120); and comparing the supplemental images of the first continuous region (132) on the surface (120) to each other and to the image having the first subset of the pixels; and when the image contains the second subset of the pixels:
circumnavigating the apparatus (100) about the second continuous region (134) on the surface (136) of the object (130A) while illuminating the surface (120) with the light beam (112) of the apparatus (100);
capturing supplemental images of the second continuous region (134) on the surface (136) of the object (130A), using the camera (114) of the apparatus (100), as the apparatus (100) circumnavigates the second continuous region (134) on the surface (136) of the object (130A); and
comparing the supplemental images of the second continuous region (134) on the surface (136) of the object (130A) to each other and to the image having the second subset of the pixels.

18. The method (300) according to claim 17, wherein either the step of circumnavigating the apparatus (100) about the first continuous region (132) on the surface (120) or the step of circumnavigating the apparatus (100) about the second continuous region (134) on the surface (136) of the object (130A) comprises using a light detection and ranging (LIDAR) system (131) to detect a position of the apparatus (100) relative to the surface (120).

19. The method (300) according to claim 17, wherein:
when the image contains the first subset of the pixels and the camera (114) is a first known distance (D) away from the first continuous region (132) on the surface (120):
the apparatus (100) captures the image, having the first subset of the pixels; and
the apparatus (100) circumnavigates the first continuous region (132) on the surface (120) such that the camera (114) remains the first known distance (D) away from the first continuous region (132) on the surface (120), and such that the camera (114) captures the supplemental images of the first continuous region (132) on the surface (120); and
when the image contains the second subset of the pixels and the camera (114) is a second known distance (D1) away from the second continuous region (134) on the surface (136) of the object (130A):
the apparatus (100) captures the image having the second subset of the pixels; and
the apparatus (100) circumnavigates the second continuous region (134) on the surface (136) of the object (130A) such that the camera (114) remains the second known distance (D1) away from the second continuous region (134) on the surface (136) of the object (130A), and such that the camera (114) captures the supplemental images of the second continuous region (134) on the surface (136) of the object (130A).

20. The method (300) according to claim 19, wherein:
either the step of circumnavigating the apparatus (100) about the first continuous region (132) on the surface (120) or the step of circumnavigating the apparatus (100) about the second continuous region (134) on the surface (136) of the object (130A) comprises using a light detection and ranging (LIDAR) system (131) to detect a position of the apparatus (100) relative to the surface (120); and the method (300) further comprises steps of:
when the image contains the first subset of the pixels, determining the first known distance (D) using the LIDAR system (131); and
when the image contains the second subset of the pixels, determining the second known distance (D1) using the LIDAR system (131).

\* \* \* \* \*